(12) United States Patent
Xu

(10) Patent No.: US 6,900,966 B1
(45) Date of Patent: May 31, 2005

(54) HEAD SUSPENSION WITH WELD POCKETS AND METHOD

(75) Inventor: Chuanjing Xu, Waite Park, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 317 days.

(21) Appl. No.: 10/214,062

(22) Filed: Aug. 7, 2002

Related U.S. Application Data

(60) Provisional application No. 60/310,932, filed on Aug. 8, 2001.

(51) Int. Cl.$^7$ ................................................. G11B 5/48
(52) U.S. Cl. ................................................. 360/244.9
(58) Field of Search .......................... 360/244.9, 244.2, 360/245.2, 244.3, 244.8

(56) References Cited

U.S. PATENT DOCUMENTS

| | | |
|---|---|---|
| 4,755,652 A | 7/1988 | LaRocca |
| 4,853,811 A * | 8/1989 | Brooks et al. ........... 360/234.7 |
| 5,201,458 A | 4/1993 | Hagen |
| 6,219,203 B1 * | 4/2001 | Arya et al. .............. 360/244.2 |
| 6,417,995 B1 | 7/2002 | Wu et al. |

* cited by examiner

Primary Examiner—Allen Cao
(74) Attorney, Agent, or Firm—Faegre & Benson LLP

(57) ABSTRACT

A head suspension assembly or component for supporting a head slider over a disk in a hard disk drive with the assembly including a plurality of head suspension components joined together by welds at weld pockets. A component includes a component thickness and one or more weld pockets formed at desired weld sites, each weld pocket including an area whose thickness is less than the component thickness with the area being greater in size than an area of a weld to be formed at the weld pocket. A method of welding components together includes providing at least two components to be welded together at a desired weld site, forming a weld pocket at the desired weld site in a component, and welding the components together. The weld pocket includes an area of reduced thickness with the area being greater in size than an area of a weld to be formed.

33 Claims, 6 Drawing Sheets

HEAD SUSPENSION WITH WELD POCKETS AND METHOD

This application claims priority to U.S. Provisional Patent Application Ser. No. 60/310,932, filed on Aug. 8, 2001 and entitled HEAD SUSPENSION WITH WELD POCKETS, which is herein incorporated by reference in its entirety.

BACKGROUND OF THE INVENTION

In a dynamic rigid disk storage device, a rotating disk is employed to store information. Rigid disk storage devices typically include a frame to provide attachment points and orientation for other components, and a spindle motor mounted to the frame for rotating the disk. A read/write head is formed on a "head slider" for writing and reading data to and from the disk surface. The head slider is supported and properly oriented in relationship to the disk by a head suspension that provides both the force and compliance necessary for proper head slider operation. As the disk in the storage device rotates beneath the head slider and head suspension, the air above the disk also rotates, thus creating an air bearing which acts with an aerodynamic design of the head slider to create a lift force on the head slider. The lift force is counteracted by a spring force of the head suspension, thus positioning the head slider at a desired height and alignment above the disk which is referred to as the "fly height."

Head suspensions for rigid disk drives typically include a base plate, load beam and a flexure. The load beam typically includes a mounting region at its proximal end for mounting the head suspension to an actuator of the disk drive, typically at a base plate of the head suspension. The load beam also includes a rigid region and a spring region between the mounting region and the rigid region for providing a spring force to counteract the aerodynamic lift force generated on the head slider during the drive operation as described above. The flexure typically includes a gimbal region having a slider mounting surface where the head slider is mounted. The gimbal region is resiliently moveable with respect to the remainder of the flexure in response to the aerodynamic forces generated by the air bearing. The gimbal region permits the head slider to move in pitch and roll directions to follow disk surface fluctuations.

In one type of head suspension the flexure is formed as a separate piece having a load beam mounting region which is rigidly mounted to the distal end of the load beam using conventional methods such as spot welds. Head suspensions of this type typically include a load point dimple formed in either the load beam or the gimbal region of the flexure. The load point dimple transfers portions of the load generated by the spring region of the load beam, or gram load, to the flexure, provides clearance between the flexure and the load beam, and functions as a point about which the head slider can gimbal in pitch and roll directions to follow fluctuations in the disk surface.

As stated above, head suspensions, as used to support magnetic read/write heads over rotating disks in disk drive units, are typically constructed from multiple components having varying thicknesses. These components may include a load beam, a flexure, a base plate and/or other components. These components are typically welded together to fabricate the head suspension. The thickness of head suspension components typically varies from about 0.001 inches to about 0.010 inches. Ongoing changes in the head suspension industry have created a need for thicker load beams in order to meet the resonance requirements of current head suspensions and disk drives. In addition, multiple piece load beams having thicker rigid sections and thinner spring regions are being used to provide the head suspension characteristics required in current disk drives.

Although these components are relatively small and thin, variations in thickness between components may cause problems in the welding process used to secure the components together. The welding of thicker components may lead to increased weld defects and increased cleaning of the welding system. In addition, set up of the welding process to accommodate differing component thicknesses decreases productivity and may cause other problems in fabrication processes or the head suspension itself.

Prior methods for the welding of head suspension components together included the use of through holes formed in the components at each weld spot so as to leave a small through hole near the center of the weld, as described in U.S. Pat. No. 5,201,458 to Hagen, entitled METHOD OF WELDING A HEAD SUSPENSION ASSEMBLY. Such a through hole would allow for the contraction of the weld upon cooling with a minimum increase in residual stress in the head suspension. Another method included the formation of through holes or partial/blind holes at the weld spots for tubular spot welds, as described in U.S. Pat. No. 4,755,652 to La Rocca, entitled METHOD AND APPARATUS FOR WELDING THIN METAL SHEETS. In this case, the holes have diameters smaller than the desired welds so as to avoid the formation of a core in the weld zone.

There is an ongoing need to improve the welding processes and associated structures available for welding head suspension components together in an efficient and productive manner.

SUMMARY OF THE INVENTION

The present invention provides a head suspension assembly or component for supporting a head slider over a disk in a hard disk drive with the assembly including a plurality of head suspension components joined together by welds at weld pockets. One or more of the components includes a component thickness and one or more weld pockets formed at desired weld sites. Each weld pocket includes an area whose thickness is less than the component thickness with the area being greater in size than an area of a weld to be formed at the weld pocket. The components may have different thicknesses.

A method of welding components together is also provided. The method includes the steps of providing at least two components to be welded together at a desired weld site and forming a weld pocket at the desired weld site in one of the components. The weld pocket includes an area of reduced thickness of component material with the area being greater in size than an area of a weld to be formed. The two components are then welded together at the weld pocket. Formation of the weld pocket may be accomplished by partial etching, or by stamping, coining, embossing, machining or other suitable processes.

DETAILED DESCRIPTION OF THE INVENTION

Figure 1:
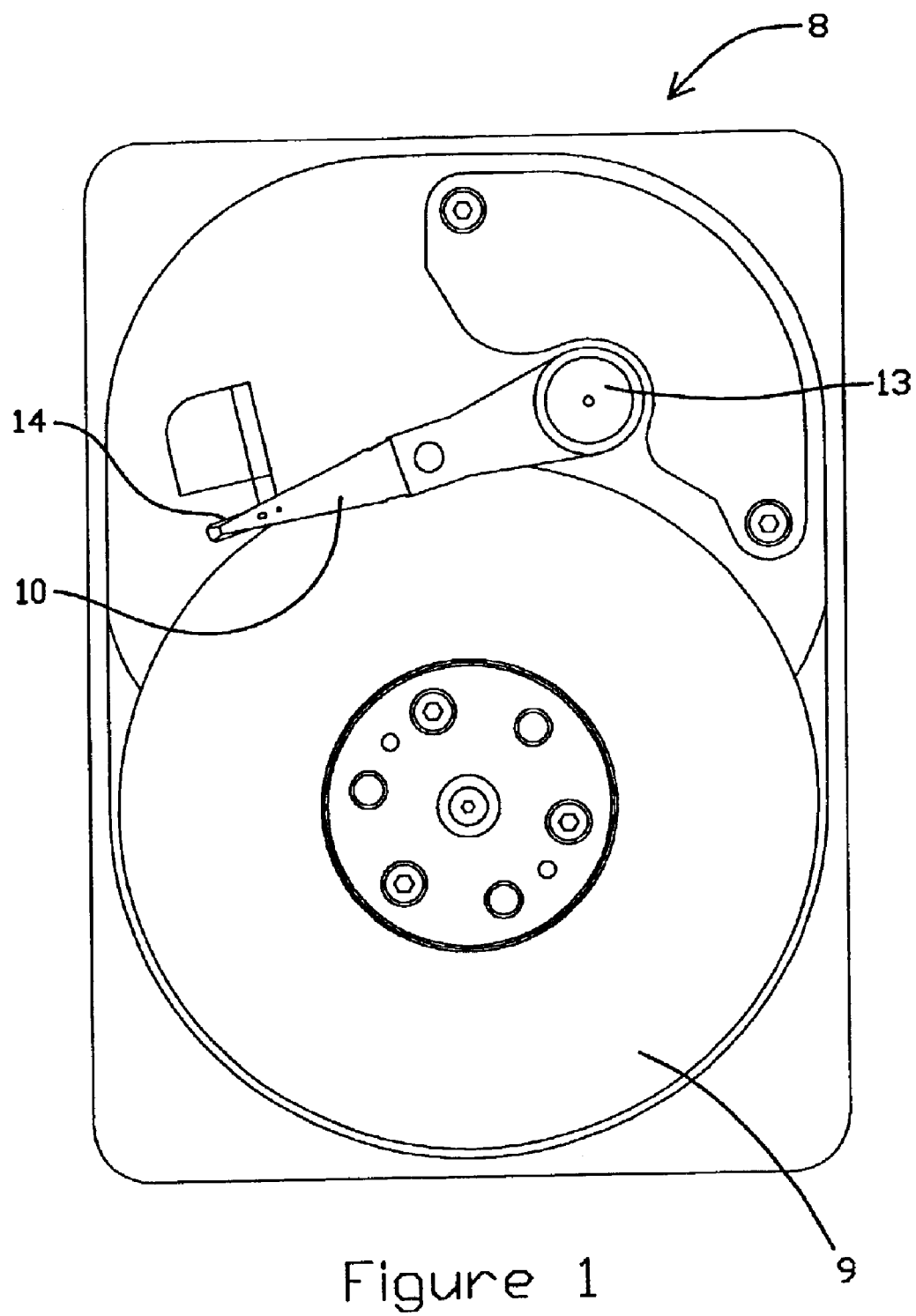
FIG. 1 is a top view of a disk drive, including a head suspension and disk.

With reference to the attached Figures, it is to be understood that like components are labeled with like numerals throughout the several Figures. FIG. 1 illustrates a rigid disk drive 8 that includes a head suspension 10. Head suspension 10 resiliently supports a head slider 14 at a fly height above a rigid disk 9 during operation. Head suspension 10 is shown connected to a rotary actuator 13, as is known, for accessing data tracks provided on the surface of rigid disk 9. Alternatively, head suspension 10 can be utilized with a linear type actuator, as is also well known.

Figure 2:
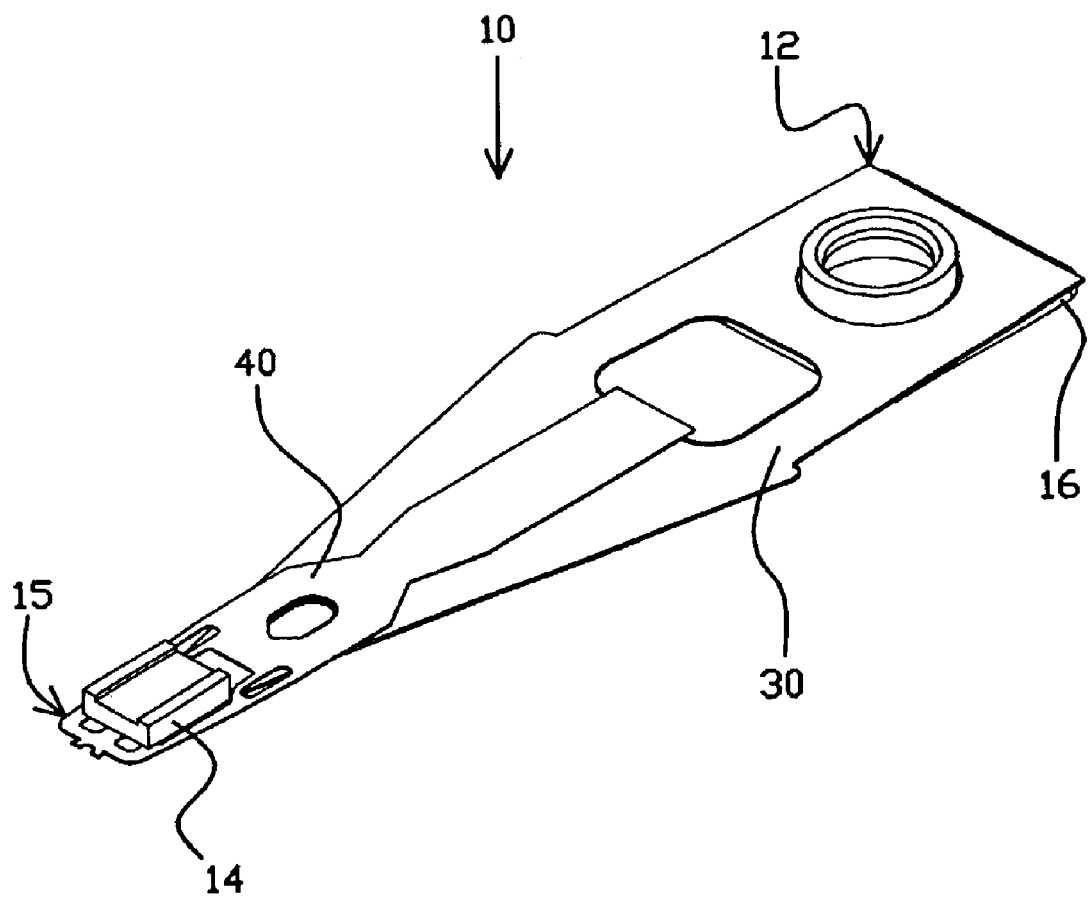
FIG. 2 is a perspective view of a head suspension, including a load beam, a flexure, a base plate and a head slider.
Figure 3:
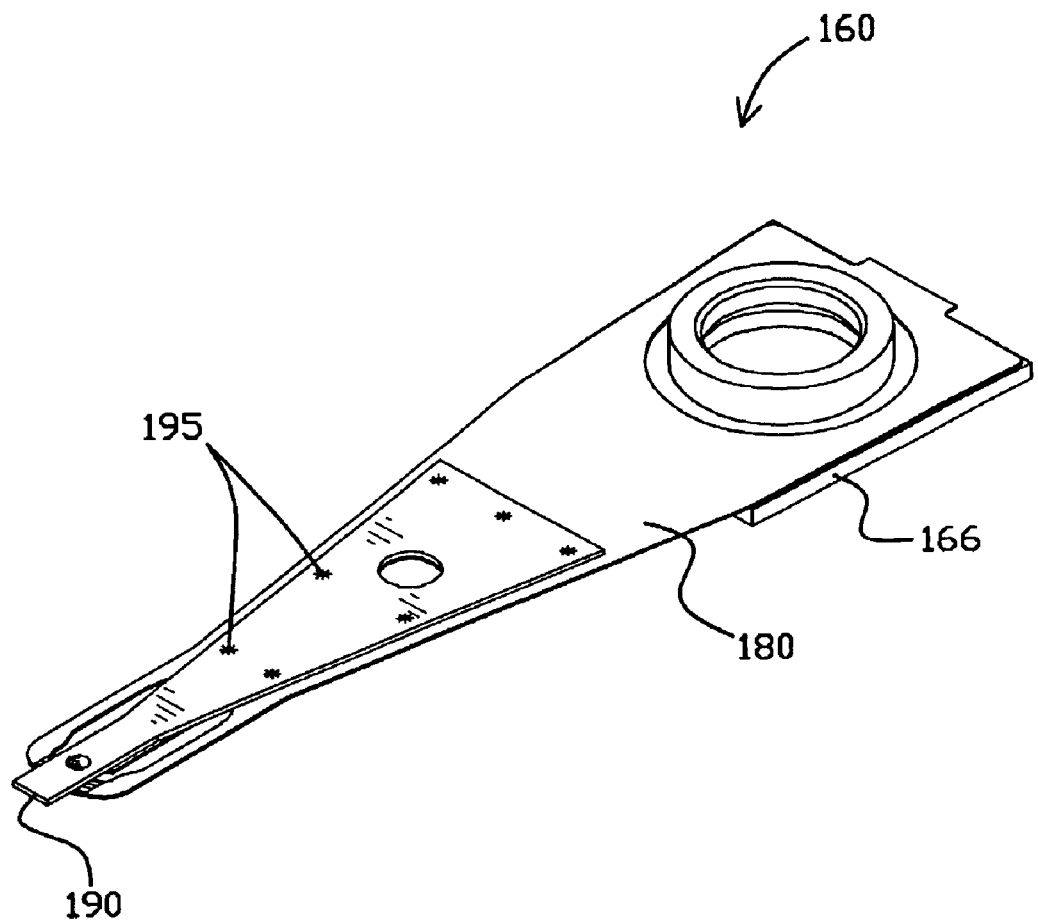
FIG. 3 is a perspective view of another head suspension, including a load beam, a base plate and a stiffener attached by welds.

Referring to FIG. 2, head suspension 10 includes a load beam 30 to which a flexure 40 is attached. A base plate 16 is mounted to load beam 30 at a proximal end 12 of head suspension 10, and is used for connection of the head suspension 10 to rotary actuator 13. The head slider 14 is mounted to the flexure 40 at a distal end 15 of the head suspension 10. As stated in the Background section, securement of the components of head suspension 10 is preferably accomplished by welding. Referring also to FIG. 3, another embodiment of a head suspension 160 is shown including a load beam 180 and a base plate 166 mounted to the load beam 180. A stiffener 190 is shown mounted to the load beam 180 by a plurality of welds 195, represented by stars.

Figure 4:
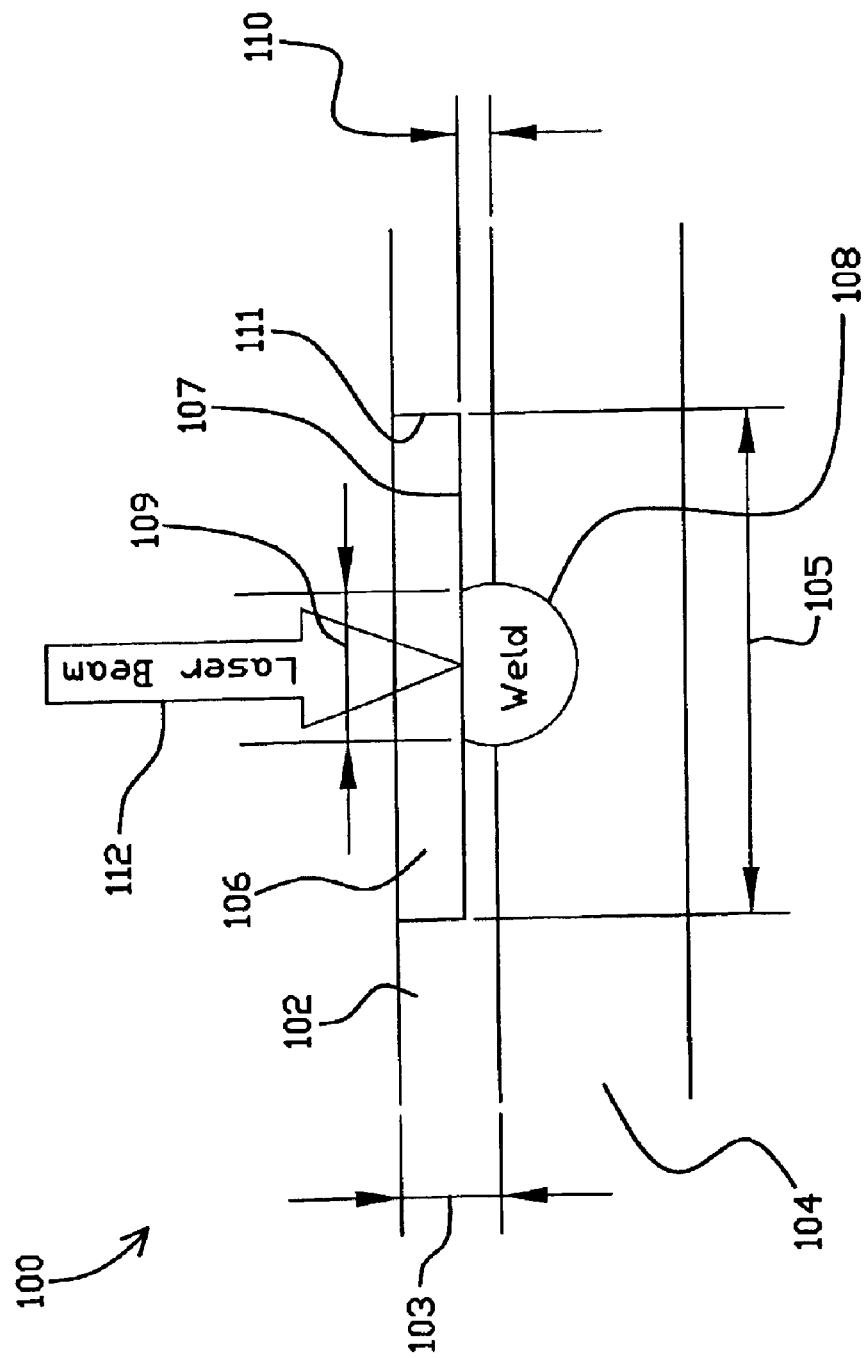
FIG. 4 is cross-sectional representation of two head suspension components including a weld pocket in accordance with the present invention used for welding of the two components together.

Referring now to FIG. 4, a cross-sectional representation of a head suspension 100 is shown, including a first or top component 102 and a second or bottom component 104. As shown, the bottom component 104 is thicker than the top component 102. A blind hole or pocket 106 having side walls 111 is formed in the top component 102 at a location in which a weld 108 is to be provided, such as the welds 195 shown in FIG. 3. Although the side walls 111 are shown to be relatively vertical, it is also to be understood that other types, styles, angles or shapes of side walls are also contemplated, such as walls that are sloped or angled.

After formation of the pocket 106, the top component 102 has a thickness 110 under the area of the pocket 106 which is less than the overall thickness 103 of the component 102. In one embodiment, the thickness 110 is in the range of about 0.0012 inches to about 0.0020 inches (about 0.030 to about 0.050 millimeters). The resulting thickness 110 can be selected independently from the overall thickness 103 of the component 102, and is generally related to the 'pull strength' of the weld. In one embodiment, the desired pull strength is greater than about 5 Newtons.

Figure 5:
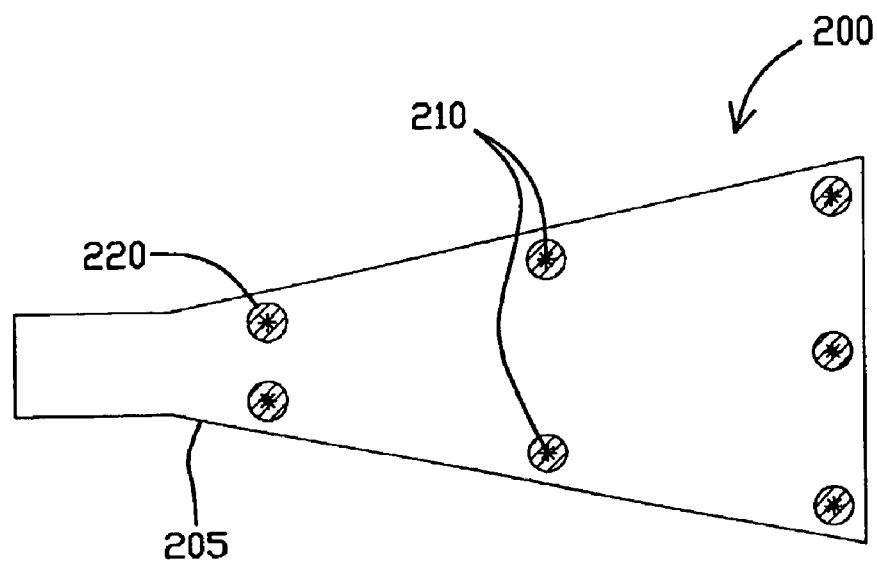
FIG. 5 is a top view of a head suspension component including a plurality of similarly sized and shaped weld pockets in which are formed welds.
Figure 6:
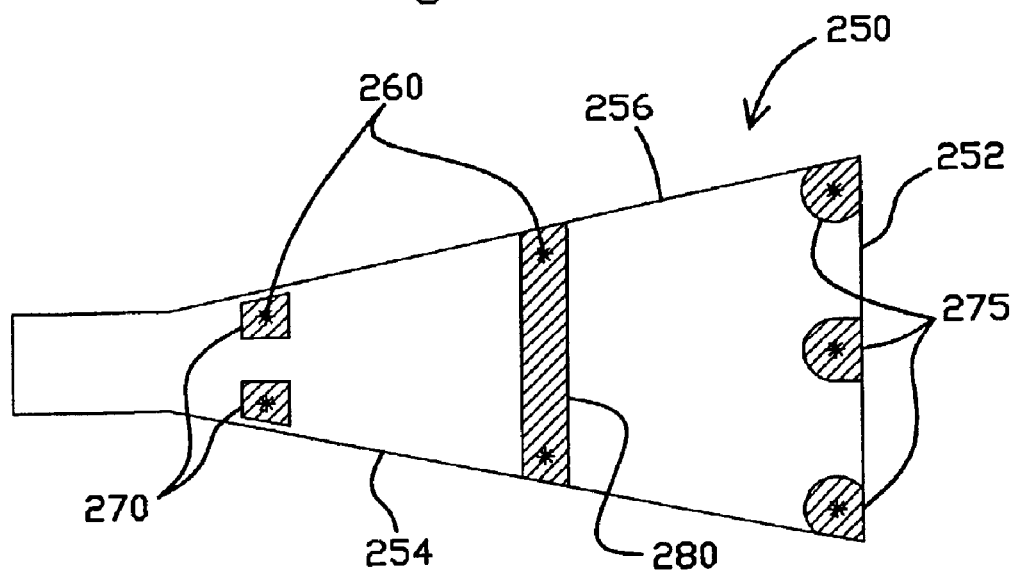
FIG. 6 is a top view of a head suspension component including a plurality of weld pockets that have varying sizes and shapes.

The pocket 106 is preferably circular in shape and is preferably formed by partial etching techniques. Referring now to FIG. 5, a head suspension component 200, similar to stiffener 190 of FIG. 3, is shown with multiple welds 210. Each weld 210 is formed in a weld pocket 220, all of which are located within the border 205 of the component 200 and all of which are circular in shape. However, other pocket shapes and formation techniques may be used and are within the scope and spirit of the present invention. In particular, the pockets may be formed at an edge or across a component from edge to edge, depending on the needs of the head suspension. Referring now to FIG. 6, a head suspension component 250 with multiple welds 260 is shown in which some of the welds 260 are formed in weld pockets 270 that are trapezoidal. In addition, some welds 260 are formed in weld pockets 275 that are generally circular in shape but are formed at an edge 252. Further, a channel type weld pocket 280 is formed from one edge 254 across the component to an opposite edge 256, in which multiple welds 260 are formed.

Referring again to FIG. 4, the weld 108 is preferably produced by a laser beam 112 and is formed between the lower surface 107 of the pocket 106 and the bottom component 104, through the remaining thickness 110 of the top component 102. The weld 108 has a diameter 109 that is preferably less than the diameter 105 of the pocket 106. In one embodiment, the weld diameter 109 is in the range of about 0.18 to about 0.26 millimeters (about 0.007 to about 0.010 inches). The pocket diameter 105 is preferably about 1.5 or more times greater than the weld diameter 109, in order to accommodate a plasma site that is larger than the weld formed during laser welding. Since the pocket diameter 105 is greater than the weld diameter 109, the pocket 106 itself does not impact the weld 108, such as with involvement of the side walls 111 in the weld 108, but instead provides a large target area of reduced thickness material in which the weld 108 may be formed.

Figure 7:
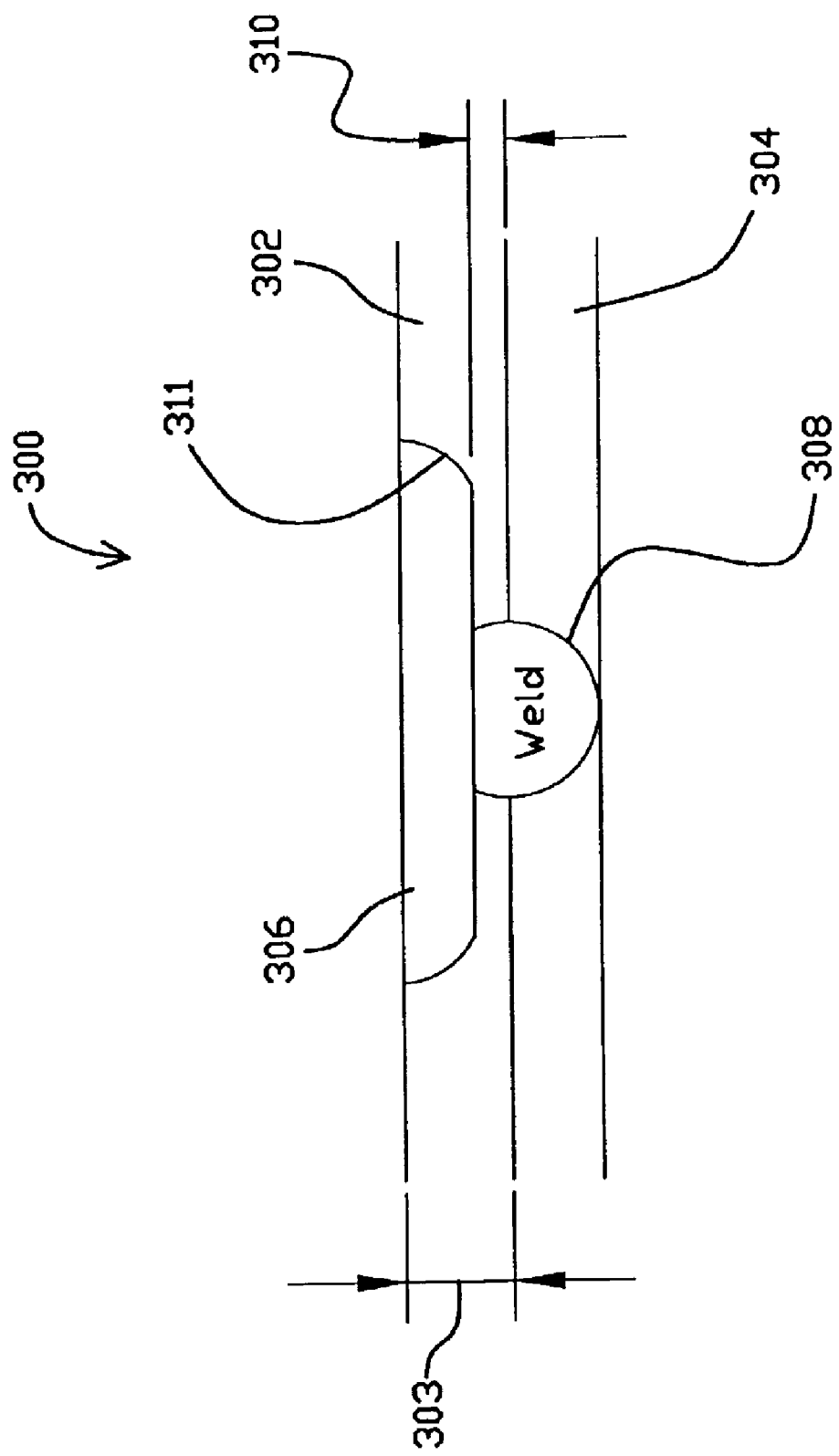
FIG. 7 is another cross-sectional representation of two head suspension components including a weld pocket in accordance with the present invention used for welding of the two components together.

Referring now also to FIG. 7, another embodiment of a head suspension 300 is shown, including a top component 302 and a bottom component 304. In this embodiment, the top component 302 is shown to be thicker than the bottom component 304. In both embodiments, components 102, 104, 302, 304 may be load beams, base plates, flexures, spring regions, or other suitable head suspension components that require securement to one another by welding. Preferably, at least one of the components is a load beam, however it is to be understood that other component combinations are also possible. However, the weld pocket structure of the present invention may also be used in other situations outside of the head suspension area, in which two thin material components are to be welded together.

As is similarly shown in the embodiment in FIG. 4, the top component 302 includes a pocket 306 wherein a weld 308 is formed by laser or other suitable method. The pocket 306 includes sloped side walls 311 and provides ample area in which the smaller diameter weld may be positioned. As with the prior embodiment, formation of the pocket 306 generally results in an area of the top component 302 having a reduced thickness 310 relative to the thickness 303 of the component 302 as a whole.

Weld pockets, such as those described above, may be formed at locations where welds are desired in order to secure two components together. The depth of the weld pocket may vary with the varying thickness of the component in which the weld pocket is being formed. It is the thickness of the material remaining under the pocket, such as thickness 110 or 310, which is an important factor in the formation of the pocket. This remaining material thickness may be consistently and uniformly provided for any component in which the pocket is being formed, by varying the depth of the pocket. Pocket formation is preferably accomplished by partial etching techniques that provide the ability to consistently and accurately locate and form the desired blind holes, however other formation techniques that are suitable for formation of such pockets, such as machining, coining or stamping, are also contemplated and within the scope of the present invention.

A consistent and uniform material thickness at the weld pocket results in a consistent and uniform welding set up that may be presented for use with a particular welding machine or system. Thus, the welding machine may be configured for a specific limited range of material thicknesses without the need to reconfigure the machine for changes in component thickness. Therefore, only one welding machine configuration is needed for thick or thin components and only one machine setup is required for many different products. This reduces the down time needed for changes in configuration of the welding machine to correspond to variations in part thickness or changes in components.

In addition, welding machines typically must be cleaned after a given number of parts have been welded. The parts are typically provided in strips that include multiple parts joined together for later detachment. The number of strips of parts able to be welded before downtime is needed for machine cleaning is known as strip count. The strip count for thinner parts is typically higher than for thicker parts, and may be as much as ten times higher under certain circumstances. By providing thick or thin parts having a consistent thin portion at the location of the weld through the use of weld pockets, the strip count for all parts may be increased significantly.

Other benefits of providing weld pockets for head suspension component welds include a reduction in weld defects and improved weld consistency. The provision of consistent and uniform material thicknesses at the pockets for welding of components having varying overall thicknesses generally provides for more consistent welds and weld fusion. In addition, thick parts typically result in more weld defects than thinner parts, and thus reducing the material thickness at the weld locations to a uniform and consistent thinness results in a reduction of weld defects.

Furthermore, the cycle time of the welding process may be improved because less energy is required to weld a thin part relative to a thicker part. Up to 80% less energy is determined to be necessary for welding at the weld pockets as compared to welding through the overall component thickness. This reduction in energy also results in a reduction in part distortion and warpage, as well as a reduction or elimination of a heat bump on the backside of the components being welded. In addition, provision of weld pockets throughout the head suspension components does not adversely affect the performance characteristics of the head suspension or the strength of the weld.

In one aspect of the present invention, a method of welding two components together is provided that includes forming weld pockets at the desired location of welds. Each weld pocket includes an area of reduced thickness of the component material, with the area being greater than the area of the weld to be formed. Each weld pocket may be formed by partial etching or other suitable formation processes. The components being welded together may vary in thickness with the top component being thicker or thinner than the bottom component and the components may be used to form a head suspension.

The weld pocket may be circular in shape and may have a diameter that is about one and one half times larger or more than the diameter of the weld being formed within the weld pocket in one preferred embodiment. The depth of the weld pocket may vary and the remaining material thickness at the weld pocket may be in the range of about 0.0012 inches to about 0.0020 inches (about 0.030 to about 0.050 millimeters), in one preferred embodiment.

In another aspect of the present invention, a head suspension having a plurality of components includes a first component and a second component welded to the first component at a weld location. The weld location includes a weld pocket formed as an area of reduced thickness material with the area being greater than the area of the weld formed therein. The other aspects of the weld pocket and components recited above also may apply.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A method of welding head suspension components together comprising the steps of:

providing at least two head suspension components to be welded together at a desired weld site;

forming a weld pocket at the desired weld site in one of the components, the weld pocket including an area of reduced thickness of component material with the area being greater in size than an area of a weld to be formed; and welding the at least two components together at the weld pocket by forming the weld that engages less than all of the component material in the weld pocket.

2. The method of claim 1, wherein the step of forming the weld pocket comprises partial etching of the component to reduce the material thickness at the weld site.

3. The method of claim 1, wherein the step of forming a weld pocket comprises at least one of stamping, etching, embossing, coining and machining of the component to reduce the material thickness at the weld site.

4. The method of claim 1, wherein the step of forming comprises forming a plurality of weld pockets, each at a desired weld site.

5. The method of claim 1, wherein the step of forming the weld pocket comprises forming a generally circular weld pocket.

6. The method of claim 1, wherein the step of forming comprises reducing the component material thickness at the weld pocket to a thickness selected independently from the overall thickness of the component and based generally on a desired pull strength of the weld.

7. The method of claim 6, wherein the desired pull strength is greater than about 5 Newtons.

8. The method of claim 1, wherein the step of forming comprises reducing the component material thickness at the weld pocket to a thickness of about 0.0020 inches (about 0.030 millimeters) or less.

9. The method of claim 8, wherein the step of forming comprises reducing the component material thickness at the weld pocket to a thickness in the range of about 0.0012 inches to about 0.0020 inches (about 0.030 to about 0.050 millimeters).

10. The method of claim 8, wherein the component material comprises stainless steel.

11. The method of claim 1, wherein the step of forming comprises forming the weld pocket with a diameter that is at least about 1.5 times larger than a diameter of the weld to be made within the weld pocket.

12. The method of claim 1, wherein the step of providing comprises providing at least two components having different thicknesses.

13. The method of claim 12, wherein the relatively thicker component is welded on top of the relatively thinner component.

14. The method of claim 12, wherein the relatively thinner component is welded on top of the relatively thicker component.

15. The method of claim 1, wherein the step of welding at the weld pocket comprises applying energy in the weld pocket to the component with the weld pocket.

16. The method of claim 15, wherein the step of applying energy comprises directly applying a laser beam into the weld pocket.

17. A head suspension assembly for supporting a head slider over a disk in a hard disk drive, the assembly comprising:
a first head suspension component having a first thickness; and
a second head suspension component having a second thickness and a weld pocket formed at a desired weld site, the weld pocket including an area of component material whose thickness is less than the second thickness the second component located relative to the first component; and
a weld at the weld pocket to join the first component to the second component, the weld engaging less than the entire area of component material at the weld pocket.

18. The head suspension assembly of claim 17, wherein the second thickness is greater than the first thickness.

19. The head suspension assembly of claim 17, wherein the first thickness is greater than the second thickness.

20. The head suspension assembly of claim 17, wherein the second component comprises a plurality of weld pockets each located at a desired weld site with the first and second components welded together at a portion of the plurality of weld pockets.

21. The head suspension assembly of claim 17, further comprising an additional head suspension component attached to one of the first and second components.

22. The head suspension assembly of claim 21, wherein the first component comprises one or more weld pockets formed at desired weld sites, and wherein the additional head suspension component is welded to the first component at the one or more weld pockets.

23. The head suspension assembly of claim 21, wherein the second component comprises a plurality of weld pockets, and wherein the additional head suspension component is welded to the second component at a portion of the plurality of weld pockets.

24. The head suspension assembly of claim 17, wherein the thickness of the component material at the weld pocket is no more than about 0.002 inches (about 0.030 millimeters).

25. The head suspension assembly of claim 24, wherein the thickness of the component material at the weld pocket ranges from about 0.0012 inches to about 0.0020 inches (about 0.030 to about 0.050 millimeters).

26. The head suspension assembly of claim 24, wherein a material of the second component comprises stainless steel.

27. The head suspension assembly of claim 17, wherein a diameter of the weld pocket is at least about 1.5 times larger than a diameter of the weld formed within the weld pocket.

28. A head suspension component to be welded to another head suspension component in a head suspension assembly for supporting a head slider over a disk in a hard disk drive, the component comprising a component thickness and a weld pocket formed at a desired weld site, the weld pocket including an area of component material whose thickness is less than be component thickness with the area of component material of the weld pocket being greater in size than an area of a weld to be formed at the weld pocket.

29. The head suspension component of claim 28, further comprising a plurality of weld pockets.

30. The head suspension component of claim 28, wherein the thickness of component material of the weld pocket is no more than about 0.002 inches (about 0.030 millimeters).

31. The head suspension component of claim 30, wherein the thickness of component material of the weld pocket ranges from about 0.0012 inches to about 0.0020 inches (about 0.030 to about 0.050 millimeters).

32. The head suspension component of claim 30, wherein a material of the component comprises stainless steel.

33. The head suspension component of claim 28, wherein a diameter of the weld pocket is at leas about 1.5 times larger than a diameter of the weld to be formed within the weld pocket.

* * * * *